US010237296B2

(12) United States Patent
Sivan et al.

(10) Patent No.: US 10,237,296 B2
(45) Date of Patent: Mar. 19, 2019

(54) AUTOMATED PENETRATION TESTING DEVICE, METHOD AND SYSTEM

(71) Applicant: CRONUS CYBER TECHNOLOGIES LTD, Haifa (IL)

(72) Inventors: Doron Sivan, Haifa (IL); Matan Michael Azugi, Kiryat Motzkin (IL)

(73) Assignee: Cronus Cyber Technologies Ltd, Haifa (IL)

( * ) Notice: Subject to any disclaimer, the term of this patent is extended or adjusted under 35 U.S.C. 154(b) by 163 days.

(21) Appl. No.: 15/114,661

(22) PCT Filed: Jan. 7, 2015

(86) PCT No.: PCT/IL2015/050027
§ 371 (c)(1),
(2) Date: Jul. 27, 2016

(87) PCT Pub. No.: WO2015/111039
PCT Pub. Date: Jul. 20, 2015

(65) Prior Publication Data
US 2016/0352771 A1 Dec. 1, 2016

Related U.S. Application Data

(60) Provisional application No. 61/931,715, filed on Jan. 27, 2014.

(51) Int. Cl.
*H04L 29/06* (2006.01)
*G06F 21/57* (2013.01)

(52) U.S. Cl.
CPC ........ *H04L 63/1433* (2013.01); *G06F 21/577* (2013.01)

(58) Field of Classification Search
CPC .......................... H04L 63/1433; G06F 21/577
USPC ......................................................... 726/25
See application file for complete search history.

(56) References Cited

U.S. PATENT DOCUMENTS

| 5,195,130 | A  | * | 3/1993 | Weiss ........................ G06F 8/60 |
|           |    |   |        | 379/93.19 |
| 7,904,962 | B1 | * | 3/2011 | Jajodia ................ H04L 63/1425 |
|           |    |   |        | 709/223 |
| 8,099,760 | B2 |   | 1/2012 | Cohen et al. |
| 8,464,346 | B2 |   | 6/2013 | Barai et al. |

(Continued)

FOREIGN PATENT DOCUMENTS

WO 2004031953 A1 4/2004
WO 2008142710 A2 11/2008

*Primary Examiner* — Haresh N Patel
(74) *Attorney, Agent, or Firm* — William Dippert; Laurence Greenberg; Werner Stemer

(57) ABSTRACT

A method for performing automatic penetration testing (PT) in an organization having at least one end unit, the method comprising: providing a PT device having a PT algorithm stored in a memory unit; connecting the PT device to an active network port in the organization; performing automated penetration testing, comprising: scanning the network to identify all end units and vulnerabilities in the network; creating possible attack scenarios; attacking the network according to the PT algorithm, and based on the attack scenarios; and creating a vulnerability report, wherein the PT algorithm simulates the operation of a real hacker, and wherein overloading the network is prevented.

11 Claims, 6 Drawing Sheets

(56) References Cited

U.S. PATENT DOCUMENTS

| | | | |
|---|---|---|---|
| 8,850,150 B2* | 9/2014 | Ramezani | G06F 21/79 711/103 |
| 8,881,288 B1* | 11/2014 | Levy | G06F 21/577 709/225 |
| 9,098,700 B2* | 8/2015 | Sethumadhavan | G06F 9/30145 726/25 |
| 9,519,781 B2* | 12/2016 | Golshan | G06F 21/53 726/11 |
| 9,774,616 B2* | 9/2017 | Flores | H04L 63/1433 726/11 |
| 9,792,430 B2* | 10/2017 | Golshan | G06F 21/53 726/11 |
| 2003/0212908 A1 | 11/2003 | Piesco | |
| 2006/0130156 A1* | 6/2006 | Ng | G06F 21/10 726/33 |
| 2007/0226794 A1* | 9/2007 | Howcroft | G06F 21/57 726/22 |
| 2008/0005799 A1* | 1/2008 | Ogawa | G06F 21/51 726/26 |
| 2008/0256638 A1 | 10/2008 | Russ et al. | |
| 2008/0301757 A1* | 12/2008 | Demarest | G06Q 10/10 726/1 |
| 2009/0007270 A1 | 1/2009 | Futoransky et al. | |
| 2010/0077472 A1* | 3/2010 | Kaabouch | G06F 12/1441 726/16 |
| 2011/0022840 A1* | 1/2011 | Stefan | G06F 12/1491 713/167 |
| 2011/0035803 A1 | 2/2011 | Lucangeli Obes et al. | |
| 2012/0144493 A1 | 6/2012 | Cole et al. | |
| 2012/0246404 A1* | 9/2012 | Malzahn | G06Q 20/341 711/115 |
| 2013/0014263 A1 | 1/2013 | Porcello et al. | |
| 2013/0031632 A1* | 1/2013 | Thomas | G06F 21/55 726/23 |
| 2013/0117849 A1* | 5/2013 | Golshan | G06F 21/53 726/23 |
| 2013/0138975 A1* | 5/2013 | Martinez | G06F 12/1483 713/193 |
| 2013/0153846 A1* | 6/2013 | Chien | H01L 27/2409 257/2 |
| 2013/0347116 A1* | 12/2013 | Flores | H04L 63/1433 726/25 |
| 2014/0075176 A1* | 3/2014 | Sadasue | G06F 9/448 713/2 |
| 2014/0133211 A1* | 5/2014 | Nazarian | G11C 7/062 365/145 |
| 2014/0301132 A1* | 10/2014 | Adachi | G11C 13/0035 365/148 |
| 2014/0366117 A1* | 12/2014 | Kumar | H04L 63/02 726/11 |
| 2015/0006066 A1* | 1/2015 | Stevens | F02D 41/2451 701/115 |
| 2015/0033223 A1* | 1/2015 | Chari | H04L 63/105 718/1 |
| 2015/0130388 A1* | 5/2015 | Fukushima | G02B 7/08 318/632 |
| 2015/0248559 A1* | 9/2015 | Madou | H04L 63/1433 726/25 |
| 2015/0381498 A1* | 12/2015 | Nomura | H04L 12/6418 370/217 |
| 2016/0057164 A1* | 2/2016 | Maeng | G06F 21/56 726/25 |
| 2016/0352771 A1* | 12/2016 | Sivan | G06F 21/577 726/11 |

* cited by examiner

AUTOMATED PENETRATION TESTING DEVICE, METHOD AND SYSTEM

CROSS-REFERENCE TO RELATED PATENT APPLICATIONS

This patent application is a U.S. National Phase Application filing under 35 U.S.C. § 371 of PCT Patent Application No. PCT/IL2015/050027, filed Jan. 7, 2015, which in turn is based upon and claims the benefit of the filing date of U.S. Provisional Patent Application Ser. No. 61/931,715, filed Jan. 27, 2014, each of which is incorporated herein by reference in its entirety.

FIELD OF THE INVENTION

The present invention relates to information security. More particularly, the present invention relates to devices, methods and systems for providing automated penetration testing of computer networks.

BACKGROUND OF THE INVENTION

Commercially available computer protection solutions (such as antivirus software or firewalls) can prevent a limited set of malwares from compromising a computer (or a network of computers). However, these solutions cannot be guaranteed to provide a full protection against an external attack by a professional hacker that can use actions and signatures different from the known set of malwares, or even introduce a Trojan malware from within the computer network. However, overcoming the available protection solutions requires hacking skills. The operation of the hacker corresponds to specific targets the hacker tries to penetrate, and someone that is not a professional hacker cannot use similar methods.

A typical vulnerabilities analysis (intended to locate weaknesses in the network) carried out by organizations includes employing an external penetration test by an "ethical" hacker. Only very large organizations can afford employment of an internal ethical hacker. The ethical hacker gains internal access to the network of the organization (without receiving any passwords) and simulates an attack of a malicious hacker in order to locate vulnerabilities in the organization.

For example, an organization with a network with about a hundred users typically has fifteen servers and it would take about four working days for an ethical hacker to check vulnerabilities at all of these servers. Since the organization usually has a limited budget for such tests, the ethical hacker is limited by time (sometimes resulting in incomplete tests). Furthermore, the organization sometimes can even expose weak points to the ethical hacker in order to save time.

As there is no guarantee that the "ethical" hacker will not perform malicious actions or steal information, there is therefore a need for a solution that does not involve employing an external hacker.

SUMMARY OF THE EMBODIMENTS

It is an object of the present invention to provide a device, a method and a system for automated penetration testing.

It is an additional object of the present invention to provide automated penetration testing device and method that can simulate the operations of a professional hacker.

It is a further object of the present invention to provide virtual automated penetration testing method.

In a first aspect of the invention a method for performing automatic penetration testing (PT) is provided in an organization having at least one end unit, the method comprising:
  providing a PT device having a PT algorithm stored in a memory unit;
  connecting the PT device to an active network port in the organization;
  performing automated penetration testing, comprising:
    scanning the network to identify all end units and vulnerabilities in the network;
    creating possible attack scenarios;
    attacking the network according to the PT algorithm, and based on the attack scenarios; and
    creating a vulnerability report,
wherein the PT algorithm simulates the operation of a real hacker, and wherein overloading the network is prevented.

In some embodiments, the PT device has standard random access memory (RAM) and FLASH memory, and wherein the PT algorithm is initially stored in the FLASH memory and then loaded to the RAM once the PT device is connected to the network.

In some embodiments, the PT device is physically separated into two sections for data storage, with a first section for performing the penetration testing and a second section with a memory element for storing the results of the penetration testing, such that data leaks are prevented.

In some embodiments, the method further comprises:
  providing additional PT devices;
  providing a central management unit; and
  connecting the additional PT devices to additional network ports, wherein all PT devices are managed by the central management unit.

In some embodiments, the method further comprises:
  removing the PT device from the active network port; and
  connecting the PT device to a different active network port,
wherein the PT device is sequentially connected to different branches of the organization.

In some embodiments, the PT device has a predefined internet protocol (IP) address, and wherein connection of the PT device to the network causes the PT device to operate as an internal web server such that access to external networks is prevented.

In some embodiments, a user controls the IP address using a managing interface of the PT device.

In some embodiments, the PT device operates at predefined time intervals.

In some embodiments, scanning the network comprises scanning of both applicative and infrastructure elements.

In some embodiments, the applicative scanning comprises scanning of a group including storage systems, private clouds, databases, camera servers, telephone servers, temperature controllers, web servers, and web applications.

In some embodiments, the infrastructure scanning comprises scanning of a group including routers, switches, WiFi networks, mail servers, terminals, supervisory control and data acquisition (SCADA), attendance clocks, IP based devices and controllers, public clouds and operating system servers.

In some embodiments, the vulnerability report is saved at a separate classified unit, only within the network of the organization.

In some embodiments, the method further comprises deleting the vulnerability report such that unwanted information leaks are prevented.

In some embodiments, the method further comprises:
  providing an update file;

removing the PT device from the active network port;

deleting data on the PT device, such that information leakage is prevented;

uploading the update file to the PT device; and reconnecting the PT device to the active network port.

In some embodiments, the method further comprises declassifying the update file prior to upload to the PT device.

In some embodiments, the method further comprises creating a simulated network based on the network scan, wherein the attack on the network is carried out on the simulated network such that hindering to the real network is prevented.

In some embodiments, the attack scenarios combine several vulnerabilities for a single attack, such that vulnerabilities in different end units are utilized for a single attack scenario.

In a second aspect of the invention a method for performing automatic penetration testing (PT) with a virtual machine is provided in an organization having at least one end unit, the method comprising:

providing a virtual PT machine having an embedded PT algorithm;

implementing the virtual PT machine onto a network in the organization;

performing automated penetration testing, comprising:
scanning the network to identify all end units and vulnerabilities in the network;
creating possible attack scenarios;
attacking the network according to the PT algorithm, and based on the attack scenarios; and
creating a vulnerability report, wherein the PT algorithm simulates the operation of a real hacker, and wherein overloading the network is prevented.

In some embodiments, the method further comprises:
providing additional virtual PT machines;
providing a virtual central management unit; and
implementing the additional virtual PT machines to additional networks, wherein all virtual PT machines are managed by the central management unit.

In some embodiments, the method further comprises:
removing the virtual PT machine from the network; and
implementing the virtual PT machine to a different network, wherein the virtual PT machine is sequentially connected to different branches of the organization.

In some embodiments, the virtual PT machine has a predefined internet protocol (IP) address, and wherein connection of the virtual PT machine to the network causes the virtual PT machine to operate as an internal web server such that access to external networks is prevented.

In some embodiments, a user controls the IP address using a managing interface of the PT device.

In some embodiments, the virtual PT machine operates at predefined time intervals.

In some embodiments, scanning the network comprises scanning of both applicative and infrastructure elements.

In some embodiments, the applicative scanning comprises scanning of a group including storage systems, private clouds, MS-SQL, MY-SQL, camera servers, telephone servers, temperature controllers, web servers, and web applications.

In some embodiments, the infrastructure scanning comprises scanning of a group including routers, switches, WiFi networks, mail servers, terminals, supervisory control and data acquisition (SCADA), public clouds and operating system servers.

In some embodiments, the vulnerability report is saved at a separate classified unit, only within the network of the organization.

In some embodiments, the method further comprises deleting the vulnerability report such that unwanted information leaks are prevented.

In some embodiments, the method further comprises:
providing an update file;
removing the virtual PT machine from the network;
deleting data on the virtual PT machine, such that information leakage is prevented;
uploading the update file to the virtual PT machine; and
reconnecting the virtual PT machine to the network.

In some embodiments, the method further comprises declassifying the update file prior to upload to the virtual PT machine.

In some embodiments, the method further comprises creating a simulated network based on the network scan, wherein the attack on the network is carried out on the simulated network such that hindering to the real network is prevented.

In some embodiments, the attack scenarios combine several vulnerabilities for a single attack, such that vulnerabilities in different end units are utilized for a single attack scenario.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

Embodiments are herein described, by way of example only, with reference to the accompanying drawings. With specific reference now to the drawings in detail, it is stressed that the particulars shown are by way of example and for purposes of illustrative discussion of the preferred embodiments, and are presented in the cause of providing what is believed to be the most useful and readily understood description of the principles and conceptual aspects of the embodiments. In this regard, no attempt is made to show structural details in more detail than is necessary for a fundamental understanding, the description taken with the drawings making apparent to those skilled in the art how several forms may be embodied in practice.

In the drawings.

DESCRIPTION OF THE PREFERRED EMBODIMENTS

Figure 1:
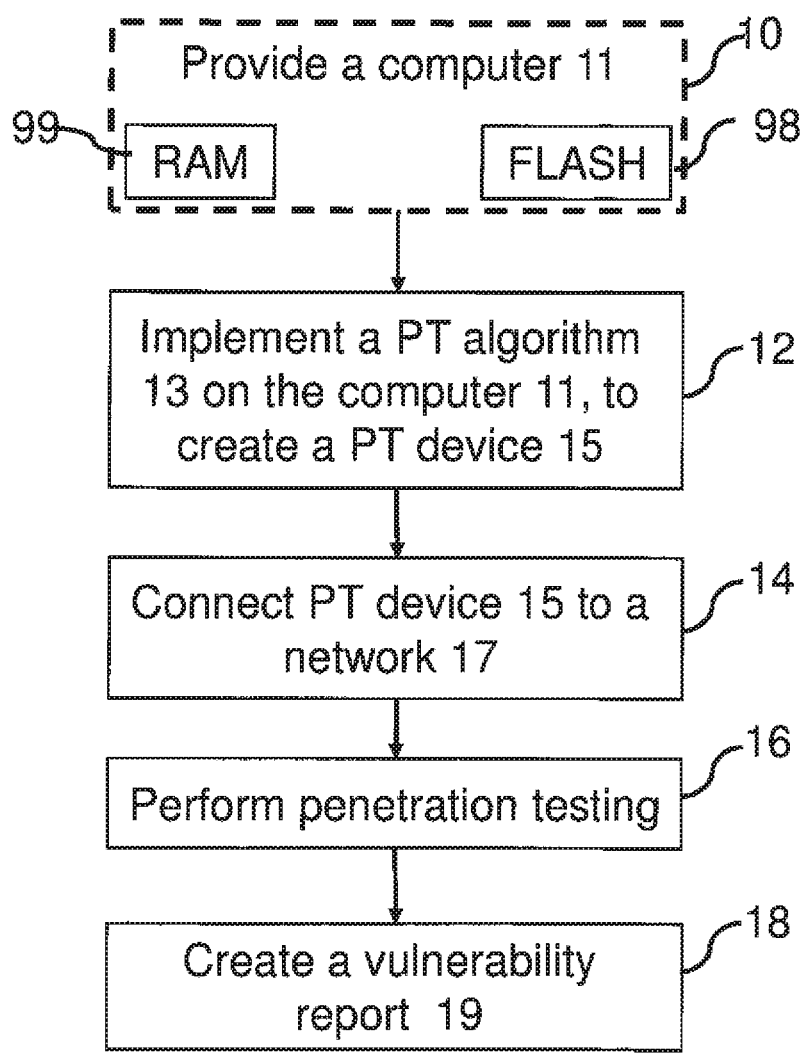
FIG. 1 shows a block diagram of a method for performing automated penetration testing with a physical device, according to an exemplary embodiment.

Before explaining at least one embodiment in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. In discussion of the various figures described herein below, like numbers refer to like parts. The drawings are generally not to scale.

For clarity, non-essential elements were omitted from some of the drawings.

To the extent that the figures illustrate diagrams of the functional blocks of various embodiments, the functional blocks are not necessarily indicative of the division between hardware circuitry. Thus, for example, one or more of the functional blocks (e.g. processors or memories) may be implemented in a single piece of hardware (e.g. a general purpose signal processor or random access memory, or the like) or multiple pieces of hardware. Similarly, the programs may be stand alone programs, may be incorporated as subroutines in an operating system, may be functions in an installed software package, and the like.

FIG. 1 shows a block diagram of a method for performing automated penetration testing with a physical device (wherein the direction of arrows indicates the direction of information flow). Initially, a basic "headless" computer 11 may be provided 10, the computer 11 having a standard random access memory (RAM 99) and FLASH 98 memory. The "headless" computer 11 may further have additional features, such as a universal serial bus port (USB), an electrical power input port, a network interface controller (NIC) or a wireless network interface controller (WNIC).

It should be noted that a headless system is a term for a computer system or device that has been configured to operate without a monitor (the missing "head"), keyboard, and mouse. A headless system is typically controlled via a network connection, although some headless system devices require a connection to be made via RS232 or USB port for administration of the device. The use of a headless device is primarily to reduce its cost, and this feature should not be viewed as limiting.

A penetration testing (PT) algorithm 13 and an operating system may then be implemented 12 onto the computer 11 and stored at the FLASH memory, thus creating a PT device 15. If a professional hacker creates the PT algorithm 13 (so that the PT algorithm may operate similarly to the hacker), then it is possible to have an automated penetration testing with this algorithm in an organization without the need to employ an external party, as any nonprofessional user at the organization may use the PT device 15.

The next step is to connect 14 the PT device 15 to an active port of network 17 in the organization (e.g. with a crossover cable connected to the NIC). The PT algorithm 13 and the operating system may now be loaded to the RAM of the PT device 15 for further use. The PT device 15 may be connected to the organization continuously or at different intervals according to the requirement of scanning.

In a further embodiment, a plurality of PT devices 15 may be connected to several branches of an organization with a central unit managing the PT devices. Alternatively, one PT device may be connected to several branches of an organization sequentially.

In a further embodiment, the PT device 15 may be incorporated into the organization as an integral element of computerized systems. For example, an organization manufacturing computerized systems (e.g. for airplanes) with a requirement of anti-hacking protection in these systems.

In a further embodiment, the algorithm implemented onto the PT device 15 may be provided with a predefined internet protocol (IP) address, so that the user may change the IP address accordingly in order to use a managing interface of the operating system of the PT device 15. The user may then enter several settings in order to commence the testing of the network with the PT device 15 operating as a web server. By changing the IP address of the PT device 15 (using the managing interface) to a required IP address in the organization, the user may operate with the original internal IP address and without the need to have access to external networks (thus also preventing information leakage). The user may now set ranges for IP addresses to be tested, IP addresses not to be tested, and possibly even uniform resource locator (URL) addresses to be tested.

The PT device 15 may then commence with performing automated penetration testing 16, where the system performs a hidden timed scan of the network 17 (instead of initiating actual attacks as performed by a professional hacker) in order to detect vulnerabilities in the network 17. With the timed scan not overloading the network 17, it is then possible to perform the automated penetration testing 16 without harming any production systems in the organization. The scan may inspect several aspects of the network 17, including an applicative aspect (e.g. databases, enterprise resource planning systems, and web applications) and an infrastructure aspect (e.g. servers, operating systems, virtual systems, and communication equipment).

The infrastructure scan may further focus on the following exemplary elements: routers, switches, WiFi networks, mail servers, terminals, supervisory control and data acquisition (SCADA), attendance clocks or other IP based devices and/or controllers, public clouds and operating system servers. The applicative scan may further focus on the following exemplary elements: storage systems, private clouds, databases (such as MS-SQL, MY-SQL), camera servers, telephone servers, temperature controllers, web servers (e.g. APACHE or IIS), and web applications (e.g. share point and web services).

In a further embodiment, the automated penetration testing scans and maps the network 17 in order to create a simulated (virtual) network onto which the testing may apply without interfering with the actual network of the organization.

Finally, the PT device 17 may create 18 a vulnerability report 19 during the scan so that the user may respond to threats in real time. The report 19 may also be prepared after completion of the scan. This vulnerability report 19 may include a detailed report to be treated by professional personnel (e.g. IT administrators) at the organization, such detailed report may include the IP addresses where vulnerability was detected, the nature of the detected vulnerability such as the hardware or software modules, etc. Alternatively, the report 19 may include a less detailed report for nonprofessional users (e.g. a manager). Furthermore, the vulnerability report 19 may be accessed by the user from the managing interface of the operating system of the PT device 15, or by exporting the report to a computer file (e.g. connecting via a USB port). It should be noted that the report 19 created by the PT device 15, provides the capability of independently preforming professional penetration tests by a nonprofessional manager and understanding the results (even without notifying other members of the organization, like IT personnel. Optionally, report 19 may suggest corrective action for increasing the security of the data system.

In a further embodiment, the results of the scan may be saved at a separate "classified" system (instead of saving at the PT device) so that sensitive data is only saved within the network of the organization. For example, sensitive information obtained during the scan may be read and/or externally stored by the user and then removed from the PT device 15. The PT device 15 may then be returned to its manufacturer, or be used in another organization or a different branch of the organization without revealing sensitive information. In some embodiments, the process of external storing and/or removing sensitive information is automatic. For example, sensitive information may be store only on RAM storage 99 and not on FLASH storage 98 such that disconnecting the PT device 15 from the power causes deletion of all the sensitive information.

At any stage of the automated penetration testing, it is possible to delete the results of the vulnerability report 19 or all the settings defined by the user in order to prevent unwanted information leaks.

With the automated penetration testing solution, there is no need to install software in each computer in the organization as it is now sufficient to only connect the "headless" PT device 15 at one endpoint, for example a free LAN port, in order to scan the entire network. Moreover, in order to scan separate servers in the same organization the PT device 15 may be simply removed from one server and connected to a different server to commence a new scan.

Figure 2:
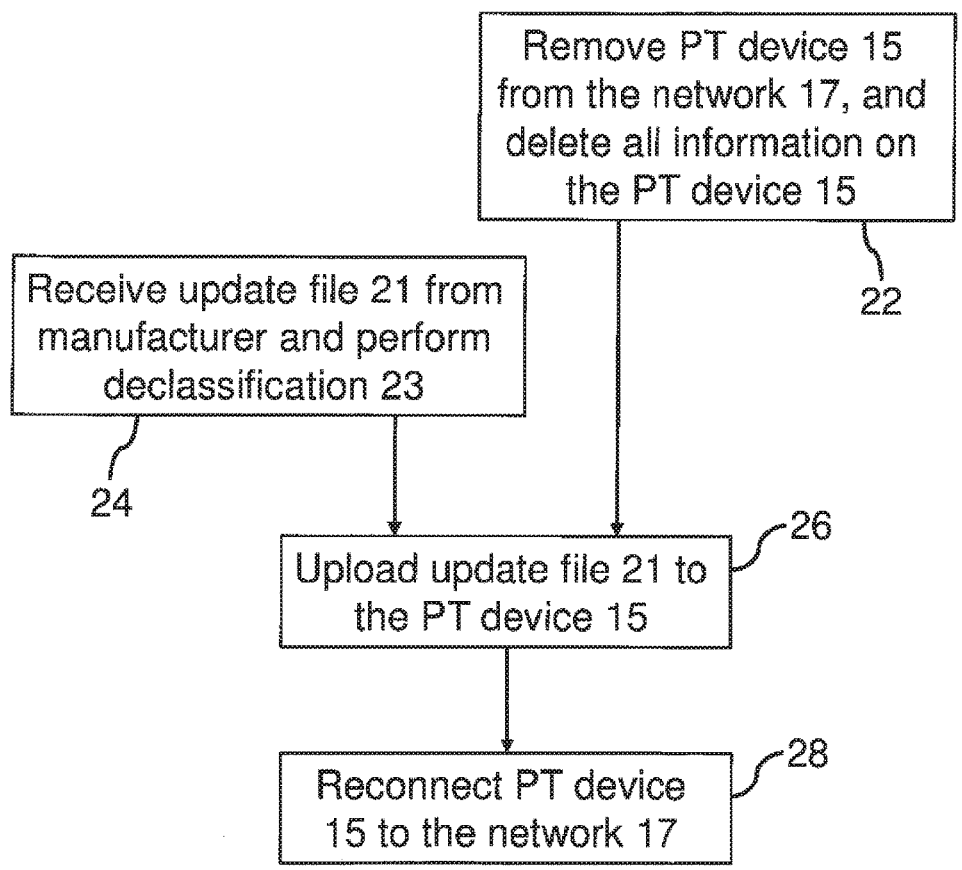
FIG. 2 shows a block diagram of a method for performing updates on the automated penetration testing system, according to an exemplary embodiment.

FIG. 2 shows a block diagram of a method for performing updates for the automated penetration testing system (wherein the direction of arrows indicates the direction of information flow). Prior to updating the PT device 15, the user may remove the PT device 15 from the network 17 and delete 22 all information on the PT device 15 so as to prevent information leakage. Additionally, the user may receive 24 an update file 21 from the manufacturer of PT device 15 (e.g. get a copy of the update file on portable media such as a CD, DVD, DOK, memory card or a portable hard drive, or download the file to a PC) and perform declassification 23 of the update file in the organization so that there is no bidirectional communication between the manufacturer and the PT device 15. In this way it is safe to introduce the update file 21 into the network 17 without the risk of data leak from the organization.

The next step is to upload 26 the update file 21 to the PT device 15 (e.g. via a USB connection) so that the updated PT algorithm may be stored at the FLASH. Finally, the PT device 15 may be reconnected 28 to the network 17 so that the automated penetration testing may proceed with the required updates and without the risk of information leaks.

Figure 3:
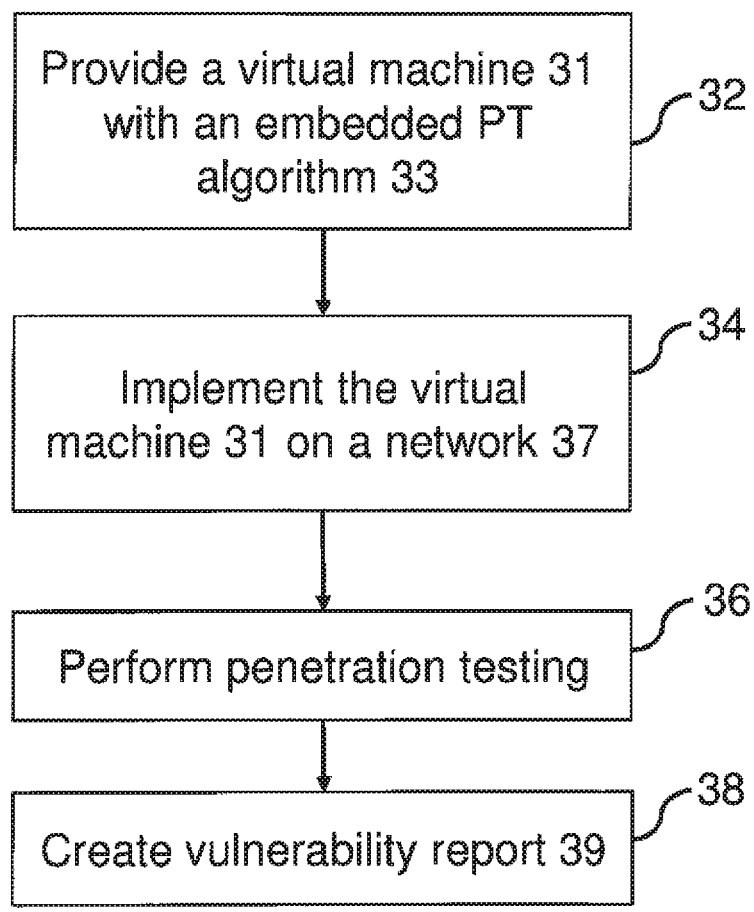
FIG. 3 shows a block diagram of a method for performing automated penetration testing with a virtual machine, according to an exemplary embodiment.

FIG. 3 shows a block diagram of a method for performing automated penetration testing with a virtual machine 31 (wherein the direction of arrows indicates the direction of information flow). Firstly, a virtual machine 31 with an embedded PT algorithm 33 may be provided 32 by the manufacturer (and for instance saved on a private cloud). The virtual machine 31 may then be implemented 34 onto the network 37 of the organization, with the user defining settings similarly to the PT device. Finally, the virtual machine 31 may commence performing the penetration testing 36 on the network 37, and creating 38 a vulnerability report 39 (similarly to the PT device).

In a further embodiment, the automated penetration testing solution (with the PT device or with the virtual machine) may be employed by closed networks that are not connected to the internet (for instance army intelligence network) in order to detect vulnerabilities without the need to involve external parties.

Figure 4:
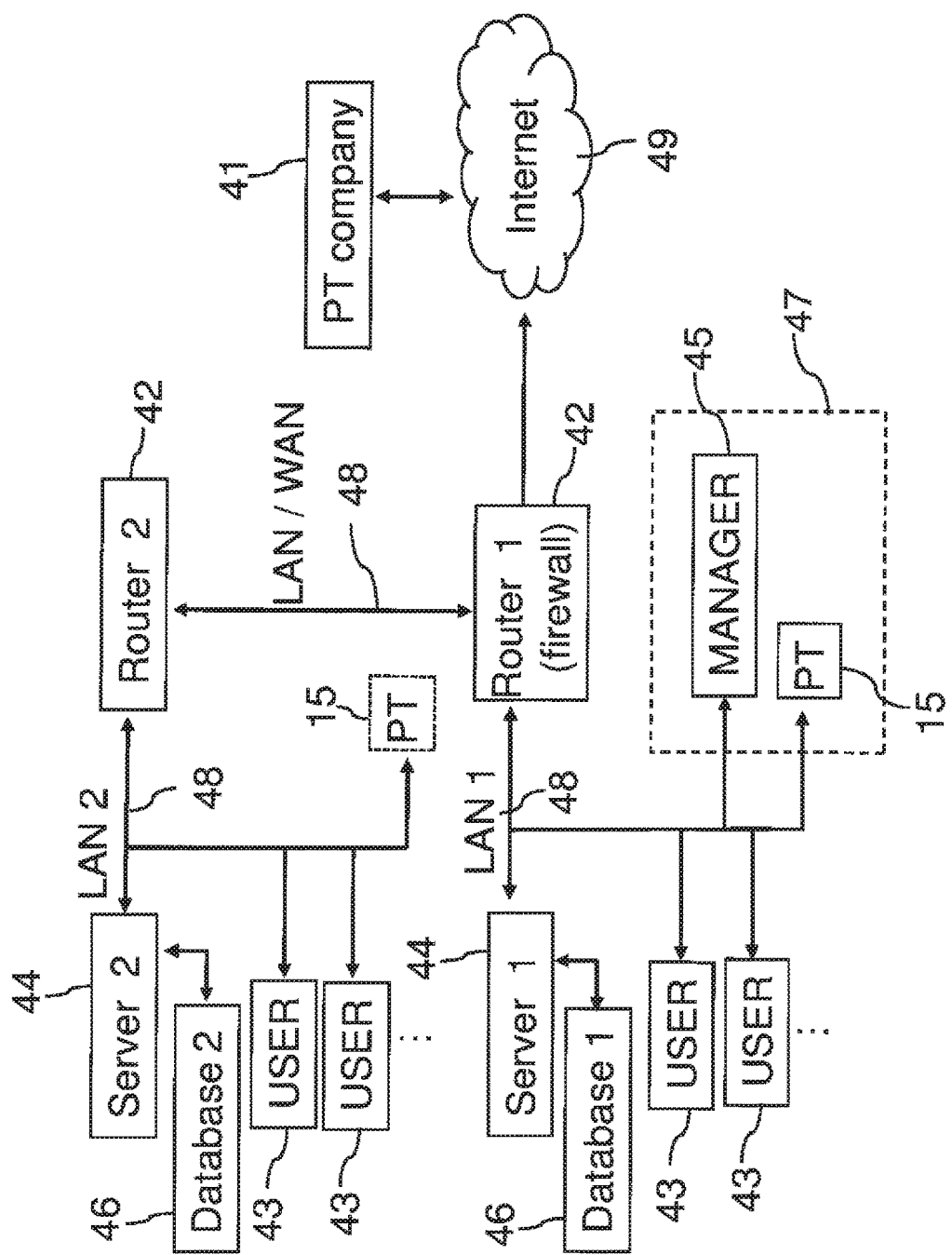
FIG. 4 schematically depicts a system used for performing automated penetration testing with a physical device, according to an exemplary embodiment.

FIG. 4 schematically depicts a system used for performing automated penetration testing with a physical device, in an example with two servers (wherein the direction of arrows indicates the direction of information flow). In order to test penetration for the first and second databases 46 of the first and second servers 44, a nonprofessional IT personnel 45 (e.g. a manager at the organization) may connect the PT device 15 to a server 44, at a classified area 47 in the organization. Once the PT device 15 is connected to the network 48 (for instance LAN or WAN), then the PT algorithm may commence testing penetration to different users 43, servers 44, databases 46 and routers 42. Firewalls may be implemented in different elements of the network in the organization (e.g. on the first router 42), and the PT algorithm may overcome the firewalls in order to continue testing penetration of the network.

It should be noted that while the network of the organization may be connected to the internet 49, thus theoretically also connected to the PT company 41 (that manufactures the PT device 15), there is total separation between the PT device 15 and the PT company 41 such that the PT company 41 may not control the PT device 15 or retrieve data from it.

In a further embodiment, the PT device has two, physically separated data storage sections. A first data storage section has memory elements for performing the penetration test (including the operating system and PT algorithm), and the second section has memory elements for storing the results of the penetration test. By physically separating these two sections, the results of the test may remain not-connected to the network of the organization (and also to external networks) so that data leaks are prevented.

For example, the first section copies the vulnerability report onto a physical device in the second section (e.g. an external flash-drive), while deleting the memory of the first section with the results of the scan. So that in order to initiate a new scan, the first section may require reimplementation of the PT algorithm.

Figure 5A:
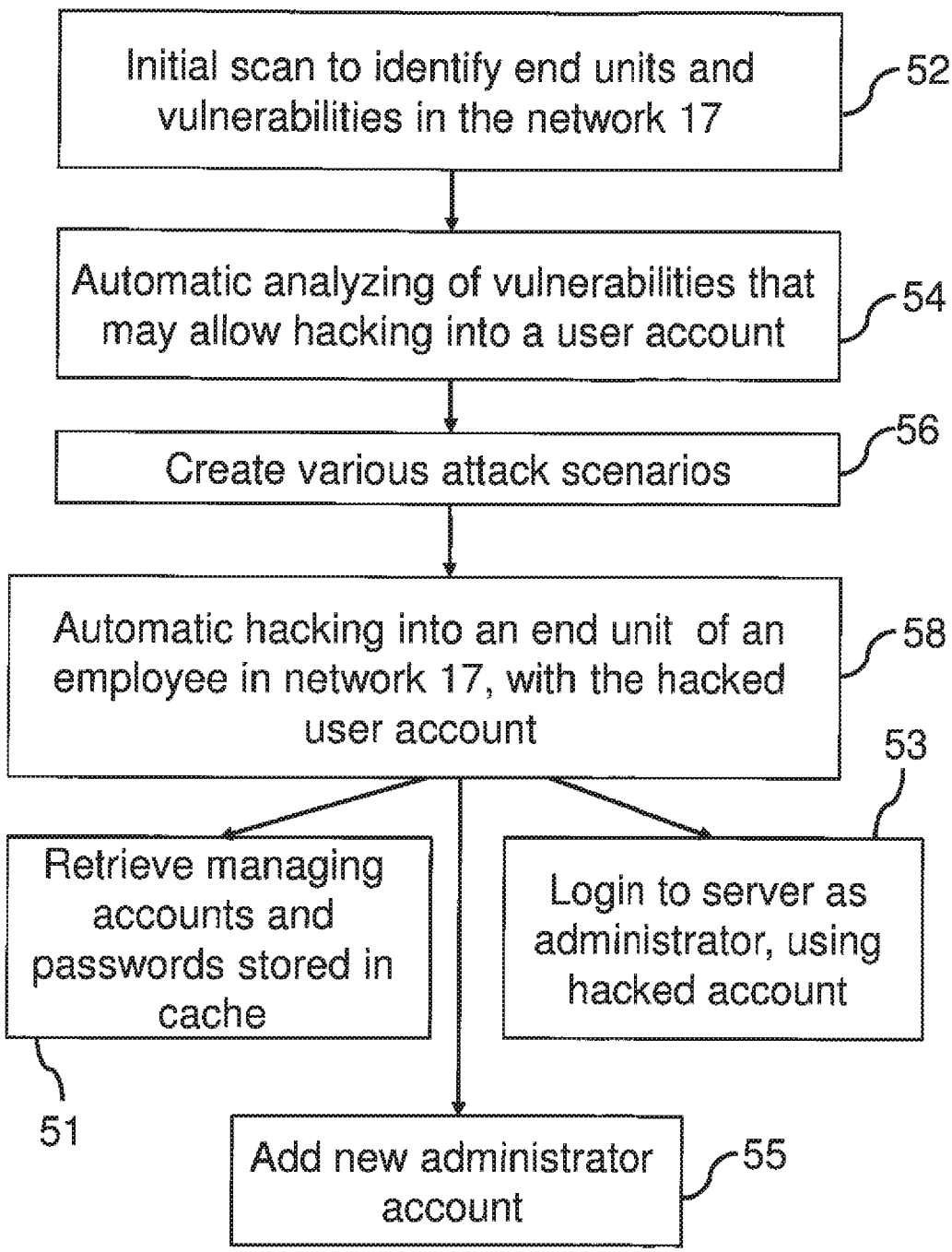
FIG. 5A shows a block diagram of a of a first exemplary penetration testing process, according to an exemplary embodiment.

FIG. 5A shows a block diagram of a first exemplary penetration testing process, with automatic imitation of the operation of a hacker (wherein the direction of arrows indicates the direction of information flow). In a first example, the operation of obtaining user accounts (i.e. user names and passwords) by a hacker is imitated. Once the PT device 15 is connected to the network 17, an initial scan 52 is carried out to identify vulnerabilities and also identify end units (i.e. computers, operating systems, ports etc.) present in the network 17.

After the initial scan 52 is carried out, the PT algorithm 13 performs automatic analyzing 54 of vulnerabilities (found in the initial scan) that may allow hacking into a user account. At this point, various attack scenarios may be created 56. Once a suitable vulnerability is found, the PT algorithm 13 performs automatic hacking 58 into an end unit of an employee (with the hacked user account) connected to the network 17 at the organization.

The PT algorithm 13 may then perform at least one of the following:

Retrieve 51 managing accounts and passwords stored in the cache memory of the system.

Utilize hacked accounts and passwords to login 53 as an administrator to the server.

Add 55 a new administrator account, thus gaining access to all user accounts.

This is contrary to commercially available solutions, where a standard scan only identifies end units and vulnerabilities. A real hacker must then attempt to hack the network, based on the results of the scan, whereby the hacking strategy is decided only by the hacker. It is appreciated that the PT algorithm 13 may thus imitate the operation of a real hacker.

Figure 5B:
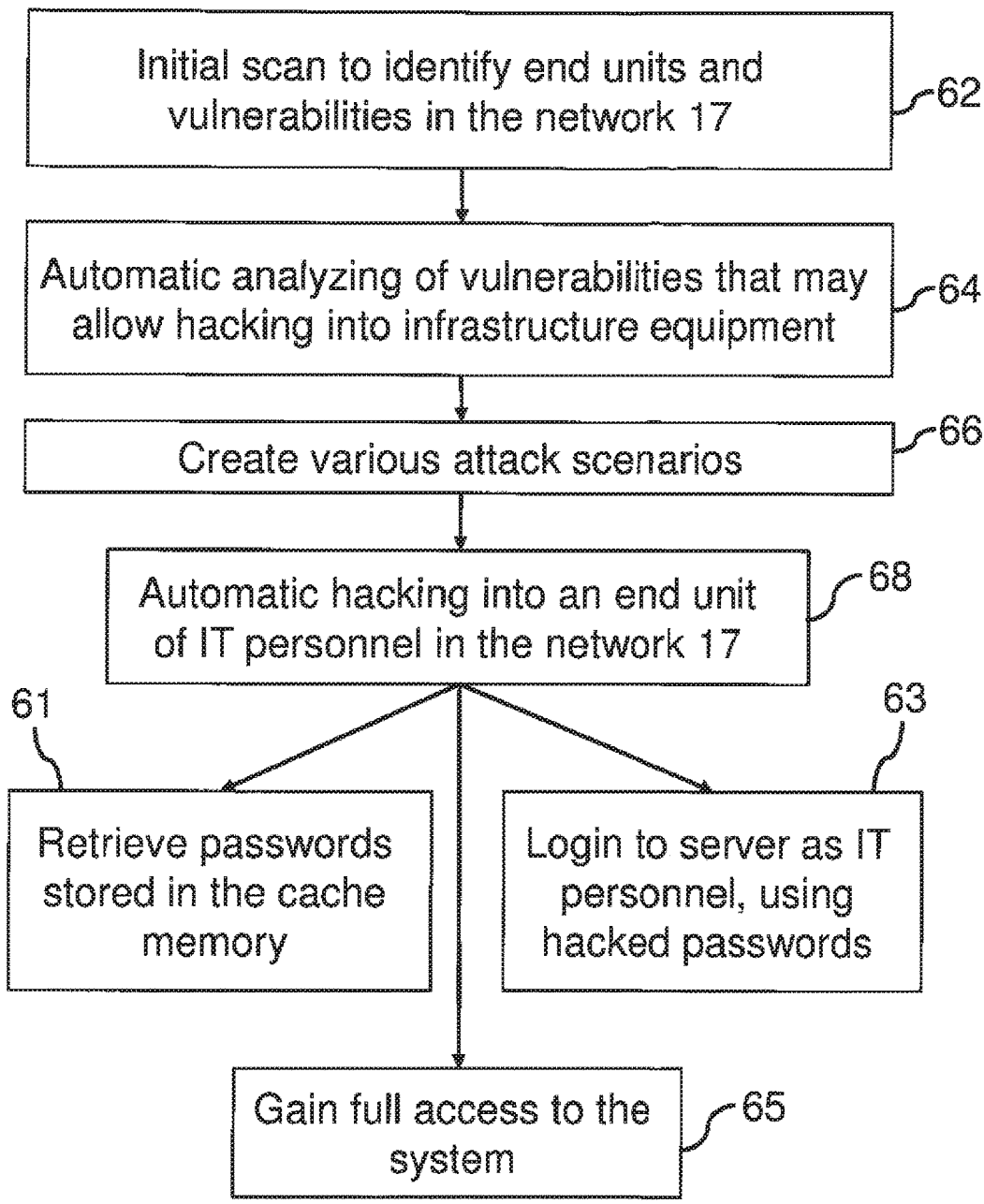
FIG. 5B shows a block diagram of a of a second exemplary penetration testing process, according to an exemplary embodiment.

FIG. 5B shows a block diagram of a second exemplary penetration testing process, with automatic imitation of the operation of a hacker (wherein the direction of arrows indicates the direction of information flow). In a second example, the operation of hacking strategic infrastructure (such as memory storage, firewalls, and switches) by a hacker is imitated. Firstly an initial scan 62 is carried out to identify vulnerabilities and also end units (i.e. computers, operating systems, ports etc.) present in the network 17.

After the initial scan 62 is carried out, the PT algorithm 13 performs automatic analyzing 64 of vulnerabilities (found in the initial scan) that may allow hacking into infrastructure equipment. At this point, various attack scenarios may be created 66. Once a suitable vulnerability is found, the PT algorithm 13 performs automatic hacking 68 into an end unit of IT personnel (preferably an administrator) connected to the network 17 at the organization.

The PT algorithm 13 may then perform at least one of the following:

Retrieve 61 passwords stored in the cache memory of the system.

Utilize hacked passwords to login 63 as IT personnel.

Gain 65 full access to the system.

This is contrary to commercially available solutions, where a standard slow scan overloads the communication equipment to identify vulnerabilities. A real hacker must then attempt to hack the equipment, exploiting the vulnerabilities from the results of the scan, whereby the hacking strategy is decided only by the hacker. It is appreciated that the PT algorithm 13 may thus imitate the operation of a real hacker.

In a further embodiment, the automatic penetration testing system may detect multiple vulnerabilities, and create attack scenarios combining several vulnerabilities for a single event. For instance, attacking a certain computer using data retrieved from vulnerabilities in three additional end units in the network.

It should be noted that in commercially available tools, a real hacker attacks the organization focusing on vulnerabilities found in typical scans with a vulnerable computer as the final destination of the attack such that the entire attack strategy is created by the individual hacker. However, with the automatic penetration testing system, additional features are provided with multiple attack destinations. The automatic penetration testing system initially scans the network, creates possible attack scenarios and then engages the network again for final attack. Furthermore, while commercially available tools distinguish between applicative and infrastructure aspects, the PT algorithm may simultaneously utilize both aspects in order to retrieve the relevant information.

For example, if a particular computer of an employee is vulnerable, the automatic penetration testing system attempts to hack into this computer while that is not the final destination of the attack. Typical operation of the PT algorithm is to automatically hack the vulnerable computer, and retrieve relevant information in order to hack additional systems. Similarly to a real hacker that has attack scenarios with several main targets, the PT algorithm may carry out several attack scenarios in order to hack into a particular server while utilizing vulnerabilities in various systems in the organization.

An additional advantage of the PT algorithm is reduction of the occurrence of false (positive) messages, as a result of actually implementing all of the attack scenarios. A problem may arise (with false messages) when a particular vulnerability is identified but cannot be properly treated, for instance due to inaccurate identification wherein the source of the vulnerability is unclear so that the vulnerability is identified by a real hacker only as a coincidence. However, with the PT algorithm all possible vulnerabilities are realized. After all vulnerabilities are checked by the PT algorithm, there are no more false messages.

It should be noted that any element added to the network (i.e. an end unit having a new IP address), may create additional attack scenarios. Therefore, the PT algorithm implements the new scenarios in order to check additional vulnerabilities. For example, adding a new cellular phone to the network may cause successful attack scenario on the mail server of the organization.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for performing automatic penetration testing (PT) in an organization having at least one end unit, the method comprising:

providing a PT device having a PT algorithm, wherein the PT device is physically separated into two data storage sections;

performing penetration testing in a first data storage section:

storing the results of the penetration testing in a second data storage section, such that data leaks are prevented;

connecting the PT device to an active network port in the organization;

performing automated penetration testing, comprising:

scanning the network to identify all end units and vulnerabilities in the network;

creating possible attack scenarios; and attacking the network according to the PT algorithm and based on the attack scenarios; and creating a vulnerability report, simulating an operation of real hacker by the PT algorithm, and wherein overloading the network is prevented.

2. The method of claim 1, wherein the PT device has standard random access memory (RAM) and FLASH memory, and wherein the PT algorithm is initially stored in the FLASH memory and then loaded to the RAM once the PT device is connected to the network.

3. The method of claim 1, further comprising:
providing additional PT devices;
providing a central management unit; and
connecting the additional PT devices to additional network ports, wherein all PT devices are managed by the central management unit.

4. The method of claim 1, further comprising:
removing the PT device from the active network port;
operating the virtual PT machine at predefined time intervals; and
connecting the PT device to a different active network port,
wherein the PT device is sequentially connected to different branches of the organization.

5. The method of claim 1, wherein the PT device has a predefined internet protocol (IP) address, wherein connection of the PT device to the network causes the PT device to operate as an internal web server such that access to external networks is prevented, and wherein a user controls the IP address using a managing interface of the PT device.

6. The method of claim 1, wherein scanning the network comprises scanning of both applicative and infrastructure elements.

7. The method of claim 1, wherein the vulnerability report is saved at a separate classified unit, only within the network of the organization.

8. The method of claim 1, further comprising deleting the vulnerability report such that unwanted information leaks are prevented.

9. The method of claim 1, further comprising:
providing an update file;
removing the PT device from the active network port;
deleting data on the PT device, such that information leakage is prevented;
uploading the update file to the PT device;
reconnecting the PT device to the active network port; and
declassifying the update file prior to upload to the PT device.

10. The method of claim 1, further comprising creating a simulated network based on the network scan, wherein the attack on the network is carried out on the simulated network such that hindering to the real network is prevented.

11. The method of claim 1, wherein the attack scenarios combine several vulnerabilities for a single attack, such that vulnerabilities in different end units are utilized for a single attack scenario.

* * * * *